United States Patent [19]

Kresner

[11] 4,393,150

[45] Jul. 12, 1983

[54] ADHESIVE BANDAGE MATERIAL

[76] Inventor: Stanley Kresner, 100 Moree Loop, #19, Winter Springs, Fla. 32708

[21] Appl. No.: 375,807

[22] Filed: May 7, 1982

[51] Int. Cl.$^3$ ............................. C08K 3/10; C08K 5/05
[52] U.S. Cl. ..................................... 523/111; 524/34; 524/35; 524/379; 524/391; 524/432; 524/451; 524/514; 525/184; 523/118
[58] Field of Search .................... 525/184; 524/34, 35, 524/391, 379, 514, 451, 432; 523/111, 118

[56] References Cited

U.S. PATENT DOCUMENTS

| | | | |
|---|---|---|---|
| 3,220,964 | 11/1965 | Giller | 524/391 |
| 3,932,341 | 1/1976 | Kutch et al. | 523/455 |
| 4,092,290 | 5/1978 | Bowser | 524/443 |
| 4,176,097 | 11/1979 | Fox et al. | 524/451 |
| 4,181,711 | 1/1980 | Ohashi et al. | 428/40 |
| 4,215,164 | 7/1980 | Bowser | 428/34 |

FOREIGN PATENT DOCUMENTS 2483939 12/1981 France ................................ 524/514

1353169 5/1974 United Kingdom .

OTHER PUBLICATIONS

Chem. Abs. 82-99600y (1975) Vitt "Self Adhesive Sealing Tape" (DT 2327007 Dec. 1974).
Chem. Abs. 72-101662j (1970) Seto "Elastomeric Sealing Comp." (DT 1941059 Feb. 1970).
Chem. Abs. 87-40572r (1977) "Butyl Rubber-Based Adhesive Compositions" Ikoma et al. (J76-121055).

*Primary Examiner*—Melvyn I. Marquis
*Assistant Examiner*—Herbert J. Lilling
*Attorney, Agent, or Firm*—William M. Hobby, III

[57] ABSTRACT

An adhesive bandage composition uses a blend of polyisobutylene, polybutene, butyl rubber with reinforcing fiber, filler material and zinc oxide blended under heat and rolled into a thin sheet. The sheet of adhesive material can be attached to a bandage material on one side and covered with a protective paper on the other and cut to shape for application to a body surface.

4 Claims, No Drawings

ADHESIVE BANDAGE MATERIAL

BACKGROUND OF THE INVENTION

This invention relates to bandages and adhesive compositions for use with bandages for attaching to dry body surfaces and which will remain adhered thereto over extended periods of time.

In the past, a wide variety of bandages have been used by physicians for attachment to the body as a bandage or for attachment of ostomy appliances, or the like, to the body. Generally, bandages must be attached to a dry body surface if the bandage is to properly hold; but in U.S. Pat. No. 3,339,546, a bandage is provided for adhering to moist surfaces. For long term use, it is desirable to have a bandage composition which will not irritate the body surfaces and will maintain its attachment to the body surfaces under long periods of time. An adhesive for holding colostomy or other appliances or for supporting areas following surgery requires a bandage having an adhesive composition which will rapidly adhere to the body surfaces and will maintain the adhesion even where a lot of moisture or other body liquids can come in contact with the bandage.

The present bandage adhesive material is formed in a relatively thick film which is a tacky, solid, and flexible material to which a bandage surface can be attached to one side and wax paper, or the like, can be attached to the other side to protect the surface until the bandage is ready for use. The bandage has no odor or taste and once it is applied to the surface to be treated will not by itself peel off, chip off, or fall off. The bandage, once attached, will remain in position through all activities of the person being treated, without irritation or toxicity. In addition to the adhering propeties of the adhesive material, the invention has been found to promote the healing of the areas treated with the bandage and to assist in various operations where body surfaces are surgically opened and must remain opened for extended periods of time. The present invention may also be employed to retain a medicament on the body surface being treated.

SUMMARY OF THE INVENTION

The present invention has an adhesive material formed with a blend of polyisobutylene, polybutene, butyl rubber, reinforcing fibers, filler material and zinc oxide. The blend is formed under heat and passed through a roller to form the material, which may then be cut to shape and attached with a bandage cloth or polymer film on one side, and a protective covering on the other. The adhesive material may have a blend of 20-35% synthetic polymers, 5-10% synthetic rubber, 1-10% reinforcing fibers, ¼-4% of zinc oxide, and 30-60% filler material such as talc.

DESCRIPTION OF THE PREFERRED EMBODIMENTS

Other objects, features and advantages of the present invention will become apparent from a further reading of the following description of the invention.

The present invention comprises primarily a bonding or adhesive composition which is formulated into sheet or film material which can be cut to shape and has a bandaging cloth or surgical appliance attached to one side and a protective paper coating attached to the other to protect the bonding surface until the appliance or bandage is ready for use. In use, the paper protective covering would have to be removed and the body surface would have to be dry. The body surface may be dried by wiping the surface with a solvent such as alcohol just prior to attaching the bonding surface. The adhesive bonding composition of the invention comprises a synthetic rubber of 5-15% by weight, synthetic polymer of 20-35% by weight, an inert filler of 30-60% by weight, zinc oxide of ¼-4% by weight, and synthetic reinforcing fibers of 1-10% by weight. The material is blended in a batcher heated to an elevated temperature such as 93° C., formed and simultaneously cooled by feeding the blend through a roller mill to make sheet material. Once the sheet material is formed, it may be coated with a protective paper or wax paper on one or both sides and may have a bandage cloth or polymer film material or a surgical appliance attached to the other side and cut to shape for a particular usage. The material, when formed, is a tacky, solid and flexible material which readily attaches to a dry body surface. An alternate embodiment allows deleting the reinforcing fibers and adding varying amounts of ethyl alcohol to the batcher when blending the compound to produce a viscous material which can be individually applied to a bandage or appliance surface for adhering the bandage to a body surface.

The composition specifically uses butyl rubber from 5-15% by weight blended with polybutene and polyisobutylene amounting to 20-35% by weight of the composition, an inert talc filler of 30-60% by weight, a reinforcing fiber of either cotton or a polymer such as kevlar in 1-10% by weight depending upon the fiber, and zinc oxide in ¼-4% by weight utilized for its healing and water resistant properties. The bonding material has a specific gravity of 1.17 and a flash point about 205° C. Polyisobutylene and polybutene are both polymers of isobutene, which can be homopolymerized to various degrees from 10 to 1000 units with the viscosity increasing with the molecular weight. Butyl rubber is a copolymerization of isobutene with a small amount of isoprene. The blending of the three polymers provides the necessary tackifier and binder for the adhesion to a body surface. The sheet material may be formed in any thickness desired, but is typically formed thicker than the adhesive material conventionally used on bandages or adhesive tapes. The following examples are illustrative of the invention:

EXAMPLE 1

Polyisobutylene 15% by weight, polybutene 20% by weight, butyl rubber 10% by weight, talc filler 50% by weight, kevlar reinforcing fibers 3% by weight, zinc oxide 2% by weight. In this example, 15 grams of polyisobutylene is added to a batcher with 20 grams of polybutene, 10 grams of butyl rubber, 50 grams of talc, 3 grams of reinforcing natural or synthetic fiber, and 2 grams of zinc oxide heated to above 90° C. and blended in a batcher and then formed into a sheet by passing it through a roller mill while simultaneously cooling the material and applying a protective paper surface to one or both sides.

EXAMPLE 2

Example 1 is followed, except that the reinforcing fiber is deleted and 3 grams of ethyl alcohol is added to the batcher as a solvent to form a viscous material which may be stored in containers for application directly to the body surface or to the bandage material.

EXAMPLE 3

Example 1 is followed, except that instead of 3 grams of aromatic polyamide fibers (kevlar), 3 grams of cotton reinforcing fibers are utilized, the reinforcing fibers adding strength to the material.

It should be clear that an adhesive composition has been provided for attaching bandages or surgical appliances to surfaces of the human body. It should, however, be clear that the invention is not to be limited to the examples shown, which are considered to be illustrative rather than restrictive.

I claim:

1. An adhesive bandage material adapted to be formed into sheet material and applied to a bandage cloth comprising:
    a blend of 20-35% by weight of polyisobutylene and polybutene;
    5-15% by weight of butyl rubber;
    1-10% by weight of reinforcing fibers of aromatic polyamide fibers;
    ½-4% by weight of zinc oxide;
    talc filler material; and
    ethyl alcohol to thereby form a viscous material capable of being formed in a sheet for attachment to bandage cloth.

2. The adhesive bandage material in accordance with claim 1, including 30-60% by weight of talc filler.

3. An adhesive material composition comprising:
    a blend of about 15% by weight of polyisobutylene and about 20% by weight of polybutene with about 10% by weight of butyl rubber, aromatic polyamide fibers, filler material, ½-4% by weight of zinc oxide and ethyl alcohol.

4. An adhesive material in accordance with claim 3, which includes 50% by weight of talc filler, 3% by weight of reinforcing fiber and 2% by weight of zinc oxide.

* * * * *